April 3, 1928.  1,664,761
R. V. TICHOTA
ANTIFROSTING DEVICE
Filed June 27, 1927
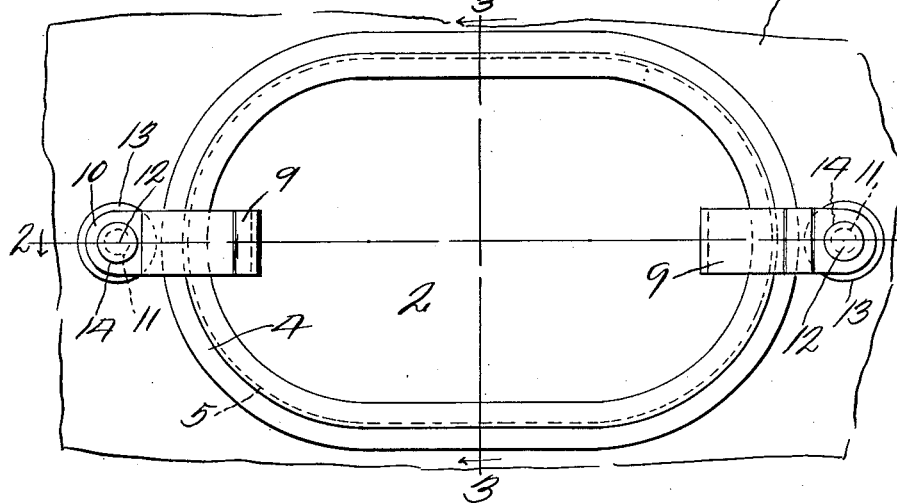
Fig. 1.
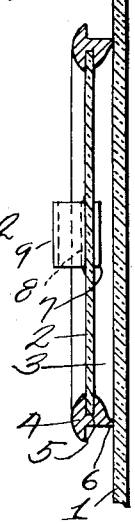
Fig. 3.
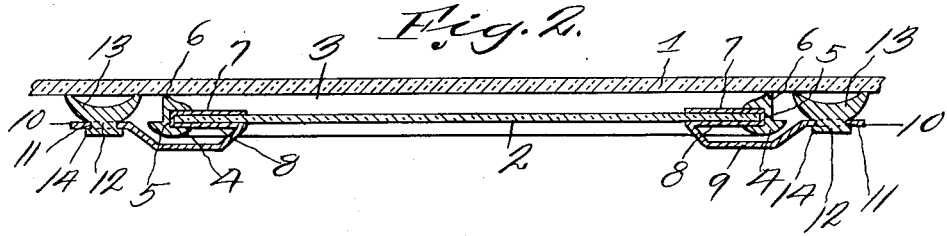
Fig. 2.
Fig. 4
Inventor
Rudolph V. Tichota
By James W. Martin
Attorney Patented Apr. 3, 1928.

1,664,761

UNITED STATES PATENT OFFICE.

RUDOLPH V. TICHOTA, OF DODGE, NEBRASKA.

ANTIFROSTING DEVICE.

Application filed June 27, 1927. Serial No. 201,827.

The invention relates to antifrosting devices for automobile windshields, and has for its object to provide a device of this character comprising a sheet of transparent material having a marginal rubber frame extending entirely around the same and spring arms arching opposite sides of the transparent material in the groove of the frame and terminating in outwardly extending arms terminating beyond opposite sides of the frame and provided with vacuum cups engaging the windshield for holding the transparent member and frame in position, thereby forming an air chamber between the windshield glass and transparent member for preventing frosting of the windshield.

A further object is to provide the outwardly extending arms with sufficient flexibility whereby when the vacuum cups are attached to the windsheld glass the inner side of the yieldable frame will be held in close engagement with the adjacent side of the windshield glass, thereby forming an airtight chamber. Also to provide the arms with apertures through which extensions carried by the vacuum cups extend and which extensions are provided with annular flanges engaging the outer sides of the arms for holding the vacuum cups on the arms.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in elevation of an antifrosting device, showing the same applied to a conventional form of windshield.

Figure 2 is a horizontal sectional view taken on line 2—2 of Figure 1.

Figure 3 is a vertical transverse sectional view taken on line 3—3 of Figure 1.

Figure 4 is a detail perspective view of a portion of modified form of frame, showing a felt strip therein.

Referring to the drawing, the numeral 1 designates the glass of a conventional automobile windshield, and disposed in spaced relation to the glass 1 is a rigid transparent sheet of material 2, preferably formed of glass, thereby forming an air space 3 between the members 1 and 2 consequently preventing formation of frost on the windshield glass 1, all of which is set forth in U. S. Patent No. 1,636,879 issued to me, the 26th day of July, 1927.

Surrounding the edge of the sheet of glass 2 is a yieldable frame 4, which frame is preferably formed from rubber and is provided with a channel 5 in its inner side, in which is disposed the marginal edge of the glass 2. The inner side of the frame 4 is provided with a V-shaped edge 6, which engages the adjacent side of the windshield glass 1, thereby forming an airtight connection between the frame and the windshield glass. Arching the ends of the glass 2 and extending into the channel 5 are U-shaped members 7, the outer arms 8 of which terminate in outwardly extending spring arms 9, which extend beyond the ends of the frame 4 and in spaced relation to the frame. Arms 9 are provided with inwardly offset arms 10 in substantial parallel relation to the windshield glass 1 and through apertures 11 of which extend the flanged extensions 12 of vacuum cups 13, and which vacuum cups when forced inwardly towards the windshield glass 1 will flex the arms 9 whereby when the vacuum cups are secured to the windshield glass, the arms 9 will exert an inward pressure on the glass 2, thereby maintaining the sharp edges 6 of the frame 4 in close engagement with the windshield glass 1. Extensions 12 have annular flanges 14, which engage the outer sides of the arms 10 and maintain the cups 13 in position at all times, and in assembling the device the extension 12, as well as the flanges 14 are compressed until they will easily pass through the apertures 11. Flanges 14 have sufficient resiliency to allow the same to be passed through the apertures 11, but sufficiently rigid to maintain the connection between the arms 10 and the vacuum cups at all times. Although the device is shown as connected to one side of a windshield, which may be inside thereof, it is to be understood that the device may be used on the outside of the windshield glass if desired.

Referring to Figure 4 wherein a modified form of frame is shown, in this form instead of the sharpened V-shaped edges 6, the inner side of the frame is provided with a channel 15, in which is disposed a felt strip 16, and which form may be used if desired.

From the above it will be seen that an antifrost device is provided for automobile windshields, which is simple in construction, the parts reduced to a minimum, and one which may be cheaply manufactured and sold. It will also be seen that the spring arms 9 are rigidly connected to the opposite ends of the sheet of glass 2, whereby upon an inward flexing of the arms 9, incident to attaching the device, an inward pressure will be exerted on opposite sides of the glass 2, thereby insuring a close engagement with the V-shaped edges 6 of the frame 4 with the windshield glass 1. Although opposite ends of the device are shown as rounded, it is to be understood that the device may be made in any shape desired.

The invention having been set forth what is claimed as new and useful is:—

1. The combination with a windshield glass, an antifrosting device adjacent one side of said glass, a sheet of transparent material carried by said antifrosting device, a yieldable frame extending around the edges of said transparent material and having a channel in which the edges of the transparent material is disposed, of means for attaching said antifrosting device to the windshield glass, said means comprising U-shaped metallic members arching the edges of the transparent material and in the channels of the frame, one side of said U-shaped members terminating in spring arms, said spring arms extending beyond the sides of the frame, and vacuum cups carried by said spring arms beyond the sides of the frame and cooperating with the windshield glass.

2. The combination with opposite sides of a transparent member disposed in spaced relation to a windshield glass, a yieldable frame surrounding the transparent member and having a channel in which the transparent member is disposed, of means for attaching said transparent member and yieldable frame to the windshield glass, said means comprising metallic U-shaped members arching opposite sides of the transparent member and disposed within the channel of the frame, spring arms carried by said U-shaped members and extending beyond opposite sides of the frame, said spring arms terminating in inwardly offset portions, vacuum cups carried by said inwardly offset portions and cooperating with the windshield glass, extensions carried by said vacuum cups and extending through apertures in the inwardly offset portions and integral flanges carried by said extensions and engaging the outer sides of the inwardly offset portions.

In testimony whereof I hereunto affix my signature.

RUDOLPH V. TICHOTA.